US008746286B2

(12) United States Patent
Weber

(10) Patent No.: US 8,746,286 B2

(45) Date of Patent: Jun. 10, 2014

(54) HYDRAULIC ACCUMULATOR

(75) Inventor: Norbert Weber, Sulzbach/Saar (DE)

(73) Assignee: Hydac Tehnology GmbH, Sulzbach/Saar (DE)

( * ) Notice: Subject to any disclaimer, the term of this patent is extended or adjusted under 35 U.S.C. 154(b) by 149 days.

(21) Appl. No.: 13/138,872

(22) PCT Filed: Apr. 22, 2010

(86) PCT No.: PCT/EP2010/002465

§ 371 (c)(1),
(2), (4) Date: Oct. 13, 2011

(87) PCT Pub. No.: WO2010/130332

PCT Pub. Date: Nov. 18, 2010

(65) Prior Publication Data

US 2012/0037253 A1 Feb. 16, 2012

(30) Foreign Application Priority Data

May 15, 2009 (DE) ........................ 10 2009 021 463

(51) Int. Cl.
*F16L 55/04* (2006.01)

(52) U.S. Cl.
USPC ................................ 138/30; 138/26; 220/721

(58) Field of Classification Search
USPC ......................... 138/26, 30–31; 220/530, 721
See application file for complete search history.

(56) References Cited

U.S. PATENT DOCUMENTS

| | | | | |
|---|---|---|---|---|
| 3,541,833 | A | 11/1970 | Mercier | |
| 3,675,308 | A * | 7/1972 | Ziegler | 29/422 |
| 3,881,519 | A * | 5/1975 | Zahid | 138/30 |
| 4,045,861 | A * | 9/1977 | Zahid | 29/454 |
| 4,077,100 | A * | 3/1978 | Zahid | 29/890.06 |
| 4,280,533 | A * | 7/1981 | Jacobellis | 138/30 |
| 4,352,231 | A * | 10/1982 | Jacobellis | 29/890.06 |
| 4,506,431 | A * | 3/1985 | Mercier | 29/454 |

FOREIGN PATENT DOCUMENTS

| | | |
|---|---|---|
| DE | 28 34 403 C2 | 1/1985 |
| DE | 103 03 988 | 8/2004 |
| DE | 10 2006 025552 | 12/2007 |
| DE | 10 2007 003 724 | 7/2008 |
| FR | 1307091 | 10/1962 |
| WO | WO 2004/067968 | 8/2004 |

* cited by examiner

*Primary Examiner* — Frederick C Nicolas

(74) *Attorney, Agent, or Firm* — Roylance, Abrams, Berdo & Goodman L.L.P.

(57) ABSTRACT

A hydraulic accumulator has a first housing shell (2) and a second housing shell (3). The opening edges (5, 6) of the shells overlap in relation to the longitudinal axis (4) of the hydraulic accumulator (1) such that they define a partial volume of the hydraulic accumulator (1). The accumulator also has a separating element (7) separating inner working chambers (9, 10) from each other within the accumulator housing (8) in a medium-tight manner. The housing is formed by the housing shells (2, 3). The opening edge (5) of the radially outer-lying housing shell (2) is positively coupled to the circumference of the radially inner-lying housing shell (3) by reshaping.

15 Claims, 2 Drawing Sheets

HYDRAULIC ACCUMULATOR

FIELD OF THE INVENTION

The invention relates to a hydraulic accumulator comprising a first housing shell and a second housing shell, both of which exhibit opening edges that overlap relative to the longitudinal axis of the hydraulic accumulator. The first and second housing shells define a partial volume of the hydraulic accumulator.

BACKGROUND OF THE INVENTION

Hydraulic accumulators in hydraulic systems serve, among other purposes, to receive a defined volume of pressurized fluid and to deliver it back again, as needed, to the system. Especially popular are hydraulic systems with hydropneumatic accumulators exhibiting a separating element configured as a diaphragm. The diaphragm separates, in particular, a fluid chamber acting as the working chamber from a gas chamber acting as the additional working chamber. The working gas used is preferably nitrogen. The diaphragm decouples or separates the gas and fluid chambers. The fluid chamber is connected to a hydraulic circuit of the system. As the pressure increases, the hydraulic accumulator absorbs the pressure medium, causing the gas to be compressed. As the pressure decreases, the previously compressed gas expands and at the same time forces the pressure medium (hydraulic fluid) back into the hydraulic circuit.

In general, a hydraulic accumulator is formed from two housing shells abutting each other with their free opening edges and, in doing so, defining in each case a partial volume or a working chamber of the hydraulic accumulator with the interpositioning of the diaphragm. The housing shells abutting each other at their face sides are usually welded together at the pertinent butt joint by a variety of welding methods. Depending on the welding method, it cannot be ruled out, in principle, that the hot metal beads or metal particles in the interior of the hydraulic accumulator will result in the diaphragm being damaged during the welding process. Such damage can have a negative impact on the strength of the diaphragm.

SUMMARY OF THE INVENTION

An object of the invention is to provide an improved hydraulic accumulator with a diaphragm that is not negatively affected during its production.

The invention basically achieves this object with a hydraulic accumulator having an opening edge of the housing shell disposed radially outward at the overlapping point that is brought into contact by reshaping with the periphery of the radially inwardly disposed housing shell, thus forming positive locking. The positive locking connection is preferably configured in a sealing manner and seals the interior of the accumulator from the exterior. The positive locking allows transmitting the tensile stress from the first housing shell to the second housing shell of the hydraulic accumulator. This approach prevents the diaphragm in the interior of the hydraulic accumulator from being negatively affected in any way during assembly.

In a preferred embodiment that facilitates the assembly of the hydraulic accumulator, at least one housing shell is brought into contact with an axial limit stop in the interior of the accumulator housing, so that after the opening edge of the radially outwardly disposed housing shell has been reshaped, this at least one housing shell is held in its end position. The wall thickness of the longitudinal opening edge to be reshaped is reduced, with the result that a transition point from the longitudinal edge to the wall forming the working chamber for the pressure medium then forms a radially inwardly directed shoulder that serves as a limit stop.

In an additional advantageous embodiment of the hydraulic accumulator, the opening edge of the housing shell, which is disposed radially outward at the overlapping point, is connected to a connecting body for the working gas to form a smooth transition of the outer surface. Preferably, the opening edge is connected to the connecting body in a sealing manner, preferably by material bonding.

Furthermore, a preferred embodiment provides that the separating element is formed by a diaphragm, its peripheral edge at the overlapping of the two housing shells being held with an anchoring member at the radially inner and/or at the radially outer housing shell. The anchoring member is formed preferably from a thickened peripheral bead along the periphery of the diaphragm and from a clamping ring enclosing radially inward this peripheral bead. The clamping ring then presses the peripheral bead into a groove-like depression of the housing shell and axially and radially secures it in a defined fashion in the accumulator housing.

Another preferred embodiment can also provide that, instead of the clamping ring, an opening edge of the radially inwardly disposed housing shell is configured with an approximately C-shaped hollow profile. The C-shaped hollow profile forms a radially inwardly extending leg and, at a distance therefrom, a radially outwardly extending leg between which the peripheral bead of the diaphragm is received. This cross-sectional arrangement of the radially inner housing shell allows the diaphragm to be held along its free face-sided enclosing circumferential edge in a sealing manner against the inside of the radially outer housing shell.

To minimize the weight of the hydraulic accumulator, the housing shells may be made of a lightweight metal alloy, preferably in the form of an aluminum alloy.

The fluid connections at the housing shells are formed preferably by connecting bodies provided in one piece with these housing shells and positioned coaxially to the longitudinal axis of the hydraulic accumulator on the opposite ends of the hydraulic accumulator. They undergo transition into a wall thickness of the housing shells that is reduced in comparison to the wall thickness at the connecting bodies.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings which form a part of this disclosure and which are schematic and not to scale.

DETAILED DESCRIPTION OF THE INVENTION

Figure 1:
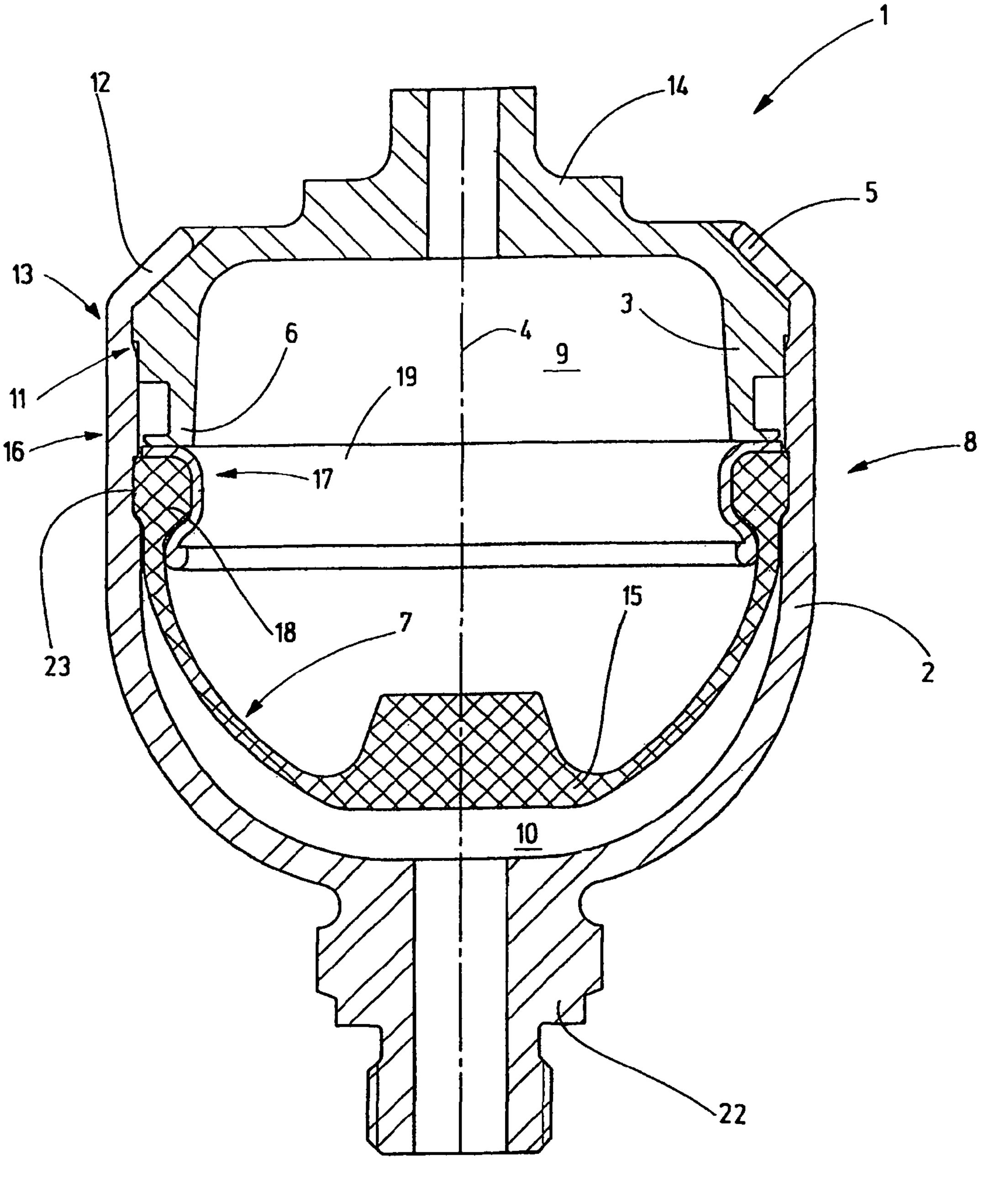
FIG. 1 is a side elevational view in section of a hydraulic accumulator according to a first exemplary embodiment of the invention.

FIG. 1 shows a longitudinal sectional view of a hydraulic accumulator 1 in the form of a diaphragm accumulator. Such hydraulic accumulators 1 can be used, for example, inside a hydraulic system to compensate for pressure fluctuations, to store energy, to cushion the pulsations of a pump, etc. The hydraulic accumulator 1 comprises a first housing shell 2 and a second housing shell 3, both of which are arranged in a rotationally symmetrical manner around a longitudinal axis 4 of the hydraulic accumulator 1. The housing shells 2, 3 form an accumulator housing 8, are made preferably of an aluminum alloy in a lightweight construction and are obtained in one working step by a compression molding process or the like.

A connecting body 22 with a fluid inlet is formed in one piece with the first housing shell 2. Similarly, the connecting body 14 for the working gas, such as nitrogen, is integrally connected to the second housing shell 3. A free opening edge 6 of the second housing shell 3 overlaps and is radially inside the first housing shell 2 along the outer periphery of the second housing shell in the area of the upper half, in particular the upper third when viewed along the axial length of the accumulator housing 8.

Abutting the overlapping area 16, a separating element 7, made of an elastomer material as the diaphragm 15, is brought into contact with a circumferential groove 23 on the inside of the radially outer first housing shell 2 and is held with an anchoring member 17. The anchoring member 17 includes a clamping ring 19 having in essence a U shape when viewed in the cross section. The clamping ring 19 is supported axially at the opening edge 6 of the second housing shell 3. In the viewing direction of FIG. 1, the upper enclosing rim of the clamping ring 19 extends parallel and in horizontal abutment with the bottom base section of the housing shell 3. The cavity located above the clamping ring 19 and exhibiting the shape of an annular groove serves to receive a pressure medium (not illustrated), for example, as an O-ring or a guide sealing strip. The clamping force, generated over the longitudinal edge 12 of the lower housing shell 2, is transmitted to the upper housing shell 3 and, thus, to the upper part of the clamping ring 19. Clamping ring 19 then presses the peripheral bead 18 of the diaphragm against a shoulder-like widening of the wall thickness of the lower housing shell 2. The widening is provided in the downward direction, and, thus, secures in a defined fashion the diaphragm arrangement.

In the area of the fluid connection of the connecting body 22, the diaphragm material is provided with a thickening that forms a valve body. With the valve body, the fluid connecting point can be closed as soon as the separating diaphragm device is moved into its bottommost closing position (not illustrated) subject to the influence of a working gas. To ensure that the peripheral bead 18 is also supported in the downward direction, the diameter of the clamping ring 19 is expanded in turn in the lower region of the peripheral bead. As a result, the clamping ring 19 also forms in the direction of the interior of the accumulator housing 8 a support for the diaphragm-like separating element 7.

Figure 2:
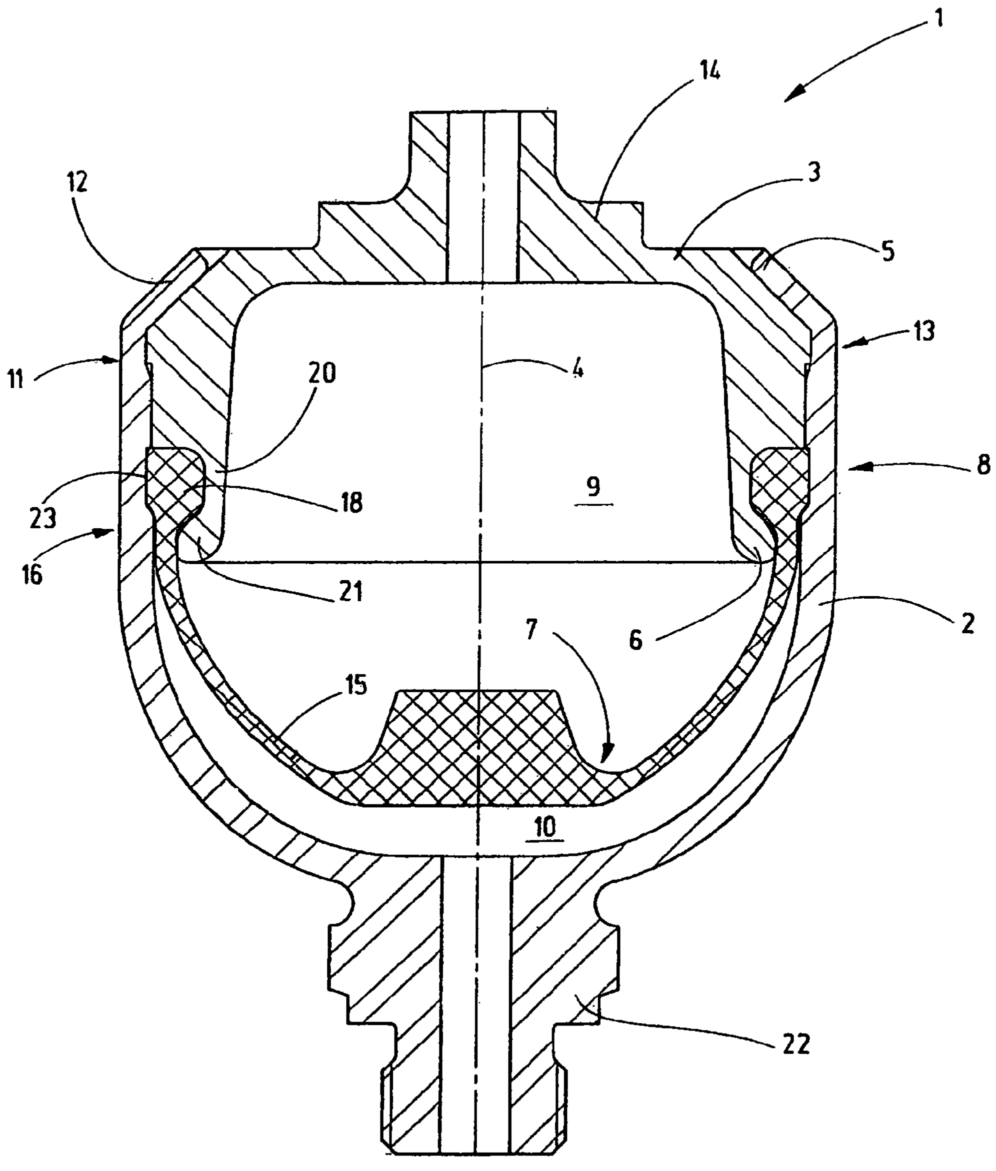
FIG. 2 is a side elevational view in section of a hydraulic accumulator according to a second exemplary embodiment of the invention.

In contrast, the exemplary embodiment depicted in FIG. 2 shows the peripheral bead 18 being held between a hollow profile, which is located radially inward and exhibits a C-shaped cross section. This hollow profile is an integral component of the upper housing shell 3. The hollow profile, defining the cross section of the opening edge 6 of the second housing shell 3, is constructed from a radially inwardly extending leg 20 and a radially outwardly extending leg 21. The same reference numerals are used in the exemplary embodiment according to FIG. 2 as in FIG. 1. The related descriptions also apply to the additional exemplary embodiment. Hence, the peripheral bead 18 also produces positive locking in the axial direction between the two housing shells 2, 3.

The first housing shell 2 exhibits a longitudinal edge 12 having a reduced wall thickness. This longitudinal edge extends axially as an enclosing strip on the periphery along the associated stop face of the first housing shell 3. At a transition point 13, at which the wall thickness of the first housing shell 2 tapers off toward the longitudinal edge 12, an axial limit stop 11 for the second housing shell 3 in turn is formed for abutment against the first housing shell 2.

The diaphragm 15 separates the working chamber 9 for the working gas from a working chamber 10 for the pressure medium. When viewed in the longitudinal direction, the longitudinal edge 12 is brought into contact, preferably by reshaping, with the upper circumferential part of the second housing shell 3 to form an interference fit assembly. To form a durable abutment, the wall thickness of the second housing shell 3 is constructed approximately twice as thick as the wall thickness of the first housing shell 2 in this area. For this purpose, one advantageous embodiment provides that the opening edge 5 of the first housing shell 2 is connected together in a sealing manner by material bonding to the second housing shell 3.

It is clear from both exemplary embodiments that the positioning of the diaphragm 15 by way of its peripheral bead is carried out in an especially advantageous manner approximately in the middle in the longitudinal direction of the accumulator housing 8. The deflecting movements of the diaphragm are then more or less identical in both directions. This movement affords an especially good working capacity for the diaphragm 15 when the hydraulic accumulator is in operation. The bead reinforcement, arranged at the diaphragm 15 at the base, protects the diaphragm 15 even in the event that said diaphragm strikes the connecting body 14 of the upper housing shell 3 in the area of the working gas connection that can be shut off. In any case, in the event that the diaphragm 15 moves upward, suitable round sections of the second housing shell 3 in the area of the leg 21 or the offset round seam on the clamping ring 19 ensure that the diaphragm 15 will gently roll away in both working directions. The hydraulic accumulator depicted can be produced very cost-effectively in a lightweight construction and lends itself well to prolonged operation even under high load.

While various embodiments have been chosen to illustrate the invention, it will be understood by those skilled in the art that various changes and modifications can be made therein without departing from the scope of the invention as defined in the appended claims.

What is claimed is:

1. A hydraulic accumulator with a longitudinal axis, comprising:
   - a first housing shell having a first opening edge and a circumferential groove on an inside surface of said first housing shell spaced axially along the longitudinal axis from said first opening edge;
   - a second housing shell having a second opening edge overlapping said first opening edge in an axially extending overlapping area parallel to the longitudinal axis thereof to define a partial volume of the hydraulic accumulator and to form an accumulator housing;
   - a diaphragm of elastomer material separating first and second inner chambers in said first and second housing shells, respectively, in a medium tight manner inside said accumulator housing, said diaphragm contacting said groove; and
   - portion of said first housing shell disposed radially outwardly of said second housing shell being bent radially inwardly against said second housing shell forming a positive locking connection between said housing shells.

2. A hydraulic accumulator according to claim 1 wherein said first and second housing shells have mating limit stops limiting insertion of said second housing shell inside said first housing shell and being spaced axially along the longitudinal axis from said groove.

3. A hydraulic accumulator according to claim 1 wherein said portion of said first housing shell has a reduced wall thickness adjacent said first opening edge relative to remaining portions of said first housing shell.

4. A hydraulic accumulator according to claim 3 wherein a transition point between different wall thicknesses of said first housing shell form a limit stop limiting insertion of said second housing shell inside said first housing shell, said transition point being spaced axially along the longitudinal axis from said groove.

5. A hydraulic accumulator according to claim 1 wherein said first opening edge extends around a connecting body for working as and is connected to and sealed to said connecting body by material bonding.

6. A hydraulic accumulator according to claim 1 wherein said diaphragm comprises a peripheral edge at said overlapping area and held with an anchoring member at at least one of said first and second housing shells.

7. A hydraulic accumulator according to claim 6 wherein said anchoring member comprises a thickened peripheral bead of said diaphragm received in said groove.

8. A hydraulic accumulator according to claim 6 wherein said anchoring member comprises a clamping ring coupled to a peripheral ring of said diaphragm.

9. A hydraulic accumulator according to claim 7 wherein said second opening edge has an approximately C-shaped profile having a radially inwardly disposed, axially extending first leg and having a second leg extending radially outwardly from said first leg; and said peripheral bead being received within said C-shaped profile.

10. A hydraulic accumulator according to claim 1 wherein said housing shells are made of a lightweight metal alloy.

11. A hydraulic accumulator according to claim 1 wherein said first and second housing shells have first and second connecting bodies, respectively, said connecting bodies being coaxial with said longitudinal axis, said portion of said first housing shell having a wall thickness less than wall thicknesses of said connecting bodies.

12. A hydraulic accumulator according to claim 1 wherein said diaphragm comprises a thickened peripheral bead; and a clamping ring has an axial part engaging a radially inner surface of said bead to retain said bead in said groove, said clamping ring being a separate member from said housing shells.

13. A hydraulic accumulator according to claim 12 wherein said clamping ring comprises a radial part extending over an axially facing end surface of said bead; and said second open edge engages said radial part.

14. A hydraulic accumulator according to claim 13 wherein said radial part and said axial part are integral.

15. A hydraulic accumulator according to claim 1 wherein said groove is radially open and closed on axial ends thereof.

* * * * *